United States Patent [19]
Smith et al.

[11] 3,844,665
[45] Oct. 29, 1974

[54] TENSILE ROPE JOINT AND METHOD OF MAKING SAME

[75] Inventors: Colin F. G. Smith; Malcolm L. Hayward, both of Hampshire, England

[73] Assignee: International Standard Electric Corporation, New York, N.Y.

[22] Filed: Dec. 4, 1972

[21] Appl. No.: 312,219

[30] Foreign Application Priority Data
Feb. 29, 1972   Great Britain..................... 9237/72

[52] U.S. Cl................................ 403/267, 403/274
[51] Int. Cl............................................ H02g 15/08
[58] Field of Search.......... 403/267, 265, 268, 300, 403/274, 275, 285

[56] References Cited
UNITED STATES PATENTS
517,338   3/1894   Garland............................ 403/274
574,234   12/1896   Barnes............................... 403/300
2,188,178   1/1940   Eby..................................... 403/300
2,959,436   11/1960   Duda................................. 403/275

*Primary Examiner*—Werner H. Schroeder
*Assistant Examiner*—Wai M. Chan
*Attorney, Agent, or Firm*—Thomas L. Peterson

[57] ABSTRACT

A joint between two metallic tensile rope members and a method of forming the same. The joint is made by means of a ferrule with an internal bore which is of a maximum diameter within the central portion of the ferrule and tapers toward both ends thereof. The strands of an end portion of each of the two rope members is splayed. Each end portion is inserted into opposite ends of the ferrule bore until they abut. A hardenable filler material is injected into the ferrule bore to impregnate the splayed strands. The filler material hardens to lock the strands within the ferrule.

1 Claim, 3 Drawing Figures

PATENTED OCT 29 1974

3,844,665

TENSILE ROPE JOINT AND METHOD OF MAKING SAME

BACKGROUND OF THE INVENTION

This invention relates to a joint for two metallic tensile rope members, in particular the stranded strength member cores of lightweight submarine coaxial cables and the method of making such a joint.

A lightweight submarine coaxial cable basically comprises a stranded steel strength member core, an inner conductor, comprising a copper tape formed around the core, dielectric extruded over the inner conductor, an outer conductor, comprising an aluminum tape formed around the dielectric, and a sheath of plastics material extruded over the outer conductor. Since the strength of the cable lies in the stranded steel core it is essential that when any joints are made in the core they are sufficiently strong to carry any strain applied to the cables. Various types of such joints are already known, and it is an object of the present invention to provide an alternative method which results in joints of increased strength relative to the previously known joints, and which, when high tensile steel strand wires are involved, avoids the fracturing of the strand wires which is produced by conventional swaging techniques.

SUMMARY OF THE INVENTION

According to the present invention, there is provided a novel joint between two metallic tensile rope members. The joint is formed by means of a ferrule having an internal bore which is of maximum diameter within the central portion of the ferrule and tapers toward both ends thereof. The strands of an end portion of each of the two rope members is splayed. Then each end portion is inserted into opposite ends of the ferrule bore until they abut. Thereafter, a hardenable filler material is injected into the ferrule bore to impregnate the splayed strands. The filler material hardens to lock the strands within the ferrule.

DESCRIPTION OF THE PREFERRED EMBODIMENTS

Figure 1:
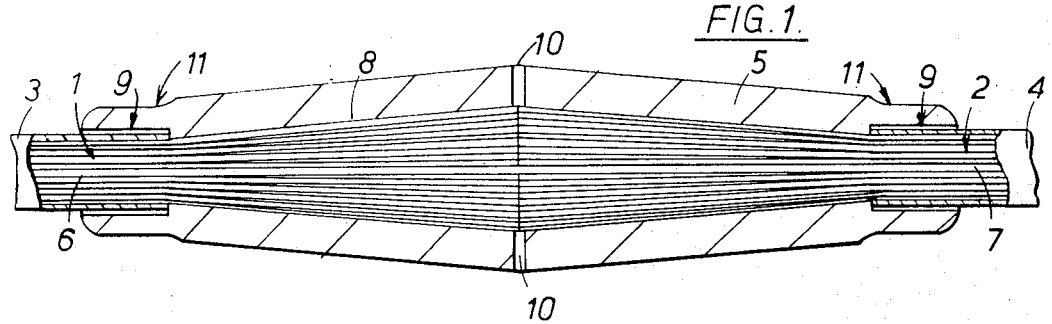
FIG. 1 is a partial, longitudinal section through a joint according to one embodiment of the invention.

Referring firstly to the joint shown in FIG. 1, the joint has been made between two stranded steel strength member cores 1 and 2, of lightweight submarine coaxial cables, which are enclosed in inner conductor tapes 3 and 4. At the end of the cores which are to be joined, the tapes 3 and 4 are removed for a predetermined distance, and the uncovered ends of the steel strands of the cores are laid out in such a manner that when they are subsequently inserted in a ferrule 5 they will be splayed out relative to the center strands 6 and 7.

The ferrule 5 has a double-tapered bore 8, as shown, and its open ends have bores 9 which are of a larger diameter than that of the inner conductor-tape covered cores. One or more filler bores 10, two of which are shown in FIG. 1, are provided at the center of the ferrule, i.e., where the tapers meet.

To make the joint in FIG. 1, the prepared core ends are cleaned and are inserted into opposite ends of the ferrule 5 until the ends of the strands abut approximately at the center of the ferrule 5. The ends 11 of the ferrule 5 are then swaged down onto the core ends, thus providing electrical connections between the copper tapes 3 and 4 as well as clamping the ferrule in position. The ferrule 5 is, for example, of steel and it may be copper plated in order to improve the elctrical connection between the tapes 3 and 4. A filler material, for example, resin compound, is then injected into the ferrule 5 via the bores 10. The resin compound may, for example, comprise a epoxy resin, such as that supplied by Union Carbide as ERL 2774 (ASTM D1763, Grade 1), together with a hardener of, for example, N-amino ethyl piperizine. A filler of aluminum powder, such as Fischer A559, may be incorporated in the resin compound. The resin compound is injected in such a manner that the injection pressure is maintained until resin compound exudes from the vents formed between the inner conductor tapes 3 and 4 and the bores 9. The injected resin compound is then cured by heating.

Figure 2:
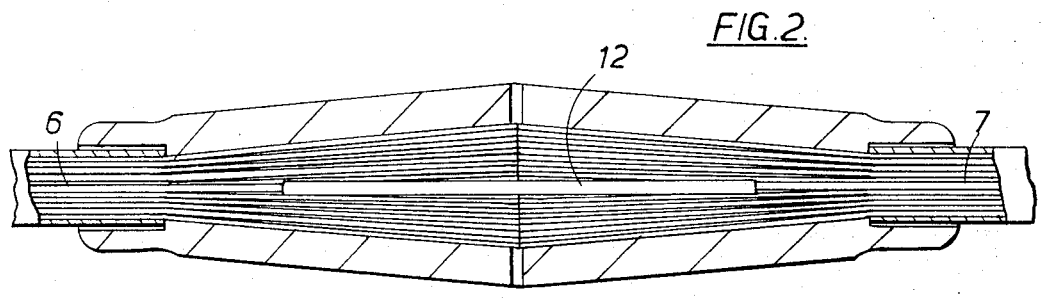
FIG. 2 is a partial, longitudinal section through a joint according to another embodiment of the invention.

The joint shown in FIG. 2 differs from that shown in FIG. 1 only in the additional use of a cylindrical member in the form of a quill 12. The quill 12 is positioned over the ends of the center strands 6 and 7, and improves the locking of the core strands into the ferrule when the latter has been injected with the resin compound, and the compound has been cured. The quill 12 may be made of steel.

Figure 3:
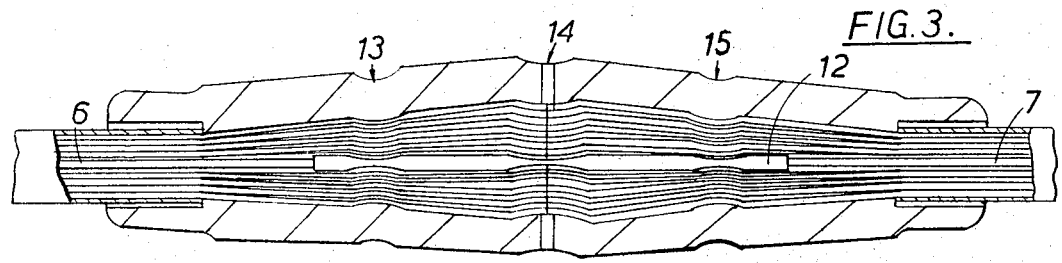
FIG. 3 is a partial, longitudinal section through a joint according to a further embodiment of the invention.

The joint shown in FIG. 3 is basically the same as that shown in FIG. 2, except that before the resin compound is cured, the center of the ferrule 5 is swaged down onto the filled strand, as shown at 13, 14 and 15. This swaging operation also increases the locking of the core strands into the ferrule. As can be seen in FIG. 3, the swaging of the ferrule 5 causes the quill 12 to be swaged onto the center strands 6 and 7. If desired, the method described in connection with FIG. 1 can be extended to employ swaging of the central portion of the ferrule 5, in a manner similar to that producing indentations 13, 14 and 15 (FIG. 3), before the resin filler compound is injected therein has been cured.

While the invention has been described with respect to the jointing of stranded cores which are covered by inner conductor tapes for submarine coaxial cables, similar methods can obviously be used in connection with joining other stranded members, such as steel ropes. In this connection copper tapes can initially be wrapped around the steel ropes at positions corresponding to where the inner conductor tapes 3 and 4 of FIG. 1 extend into the ferrule 5, in order to improve the connection between the ferrule 5 and the rope, although these tapes are not absolutely necessary. In other variations on the methods described above the filler bores 10 can be dispensed with, and the resin compound injected via axial slots, comprising the bleed vents at one end of the ferrule 5, until the resin compound exudes from the bleed vents formed at the other end of the ferrule 5.

What is claimed is:

1. A joint between a pair of metallic tensile rope members comprising:

an elongated one-piece ferrule with an internal bore having a maximum diameter within the central portion of the ferrule, said ferrule tapering toward both ends thereof;

each rope member having the strands at an end portion thereof splayed out;

said end portions being mounted within opposite ends of said ferrule and abutting each other adjacent said central portion;

a hardened filler material impregnating said splayed strands to lock the strands in said ferrule; and at least one filler injection bore extending through the wall of said ferrule near the central portion thereof and means providing vent passages adjacent to the opposite ends of said ferrule.

* * * * *